United States Patent Office 3,534,076
Patented Oct. 13, 1970

3,534,076
LUBRICATION SYSTEM DERIVED FROM ORGANO TITANATE COMPLEXES
Max Kronstein and William H. Kapfer, New York, N.Y., assignors, by mesne assignments, to the United States of America as represented by the Secretary of the Navy
No Drawing. Continuation-in-part of application Ser. No. 514,435, Dec. 15, 1965. This application Jan. 31, 1968, Ser. No. 701,844
Int. Cl. C07f 7/28, 7/22, 3/06
U.S. Cl. 260—429.5                                    1 Claim

ABSTRACT OF THE DISCLOSURE

The subject invention relates to a method of preparing a unique composition which is derived from alkyl titanates and organic derivatives of other metals such as zinc 2 - ethylhexanoate, tri - isopropyl borate, tetra - butyl - tin, hexabutyl-di-tin, tri-n-butyl-tin 2-ethylhexanoate, di-butyl-tin di-methoxide and molybdenyl acetyl acetonate. The unique composition has been found to exhibit improved hydrolytic stability and beneficial lubricating and hydraulic fluid properties and characteristics.

---

This is a continuation-in-part of patent application, Ser. No. 514,435, filed Dec. 15, 1965, now abandoned.

Unmodified alkyl titanates have been found to be of little general use due to their tendency to hydrolyze in the presence of even minute traces of water. Various attempts have been made in the past to improve the hydrolytic stability of the alkyl titanates. One such attempt, which was reasonably successful, is described in detail in applicants' U.S. Pat. 3,196,166 which is entitled "Complex Alkyl Titanate Derivatives and Their Modifications" and which issued July 20, 1965. In accordance with the modification technique disclosed in applicants' said patent, the alkyl titanate is reacted with a metallic derivative of an organic acid to form a complex compound which contains titanium as well as the metal in the organic acid derivative. The reaction product is then separated from various by-products as well as the original unreacted ingredients in a vacuum distillation process and is found to possess improved hydrolytic stability and unique lubricating and hydraulic fluid properties and characteristics.

Oxidation and hydrolytic stability tests have shown, however, that this titanium-metal complex reaction product may require additional stabilization by a further removal of retained still-reactive groups. As disclosed in applicants' said patent, the titanium-metal reaction product was modified for this purpose with a suitable tetra alkyl silane such as dioctyl-didodecyl silane. Although modification of the titanium-metal reaction product in this additional manner was found to provide a highly satisfactory lubricating compound, the viscosity of which could be readily reduced with a suitable dilutant fluid, formulation and use of the dioctyl-didodecyl silane and other suitable tetra alkyl silanes are generally difficult and cumbersome.

It is therefore a principal object of the present invention to provide a novel and improved method of preparing a new complex alkyl titanate reaction product.

It is a further object of the present invention to provide a novel and improved method of preparing and modifying a complex alkyl metallic titanate reaction product which exhibits improved stability, limited flamability and reduced viscosity.

Further objects and advantages of the invention will be apparent hereinafter.

In accordance with the invention, an alkyl titanate is first reacted with a zinc derivative of an organic acid containing at least five carbon atoms such that a portion of the zinc remains in its basic form and is coupled to the zinc derivative by a covalent bond. The titanium-zinc reaction product is then separated from by-products such as any alcohols liberated from the alcohol groups present in the original alkyl titanate and from any part of the organic component of the zinc derivative through a vacuum distillation process. The titanium-zinc reaction product is then further modified by another suitable organic agent such as tri isopropyl borate, tetra butyl tin or hexabutyl di tin to further stabilize the metal organic reaction product.

Specific and preferred embodiments of the invention are illustrated by the following examples:

EXAMPLE I 270 grams of tetraisopropyl titanate were mixed with 857 grams of zinc 2-ethylhexanoate in the manner described in applicants' said patent. More specifically, mixture of tetraisopropyl titanate and zinc 2-ethylhexanoate is distilled below a temperature of 280° C. at a pressure of 1 to 10 mm. of mercury to obtain a first reaction product. 150 grams of the said first reaction product were then subjected to vacuum distillation with 50 grams of tri-isopropyl borate. Approximately 150 ml. of a distillation cut was then obtained under 0.1 mm. Hg pressure at a distillation range of 275°–280° C. The resulting compound was found to have a flame point of 325° C. Lubricity of the compound was determined in a Shell Four-Ball Wear Tester. In a 30 minute test at 600 r.p.m. at 60° C. with a load of 20 kg., a scar length of 0.33 mm. was produced on the steel balls of the tester.

EXAMPLE II 270 grams of tetraisopropyl titanate were mixed with 857 grams of zinc 2-ethylhexanoate in the manner described in Example I. 180 grams of the resulting reaction product were then mixed with a catalyst aluminum chloride and 60 grams of tetra-butyl tin. The mixture was then subjected to a vacuum distillation under 1 mm. Hg pressure. At 310° C., 135 ml. of a reaction product was obtained which had a flash point of 270° C. and a flame point of 295° C. This fluid under the above described Shell Four-Ball Wear Test conditions produced a scar of 0.31 mm.

EXAMPLE III

Another complex material with similar characteristics was obtained by reacting 210 grams of the tetraisopropyl-titanate-zinc octoate reaction product described in Examples I and II with 70 grams of hexabutyl di tin. This material was obtained under 1 mm. Hg pressure at a distillation temperature of approximately 325° C.

EXAMPLE IV

In a single reaction, a three metal organic complex fluid was obtained by reacting under vacuum distillation 30 grams of a tetra isopropyl titanate with 30 grams of tri-n-butyl-tin 2-ethylhexanoate and 180 grams of zinc 2-ethylhexanoate in the presence of 0.5 gram of aluminum chloride. At 310° C. under 1 mm. Hg pressure, 150 ml. of a viscous fluid complex was obtained. Its lubrication characteristic were found to be in the same range as those of the products of the preceding examples.

EXAMPLE V

Another complex was obtained by directly reacting 100 grams of tetraisopropyl titanate with di-butyl-tin di-methoxide. At 95° C. with 1 to 2 mm. of Hg pressure, a fluid reaction product was obtained and 85 grams of this titanium-tin metal organic fluid was further complexed by reacting it with 285 grams of zinc 2-ethylhexanoate. This fluid metal organic complex containing three different metals in metal-organic complex form was found to have a flash point of 525° F. and a flame point of 590° to 600° F. when subjected to the above described Shell Four-Ball Wear Test, scar marks of 0.34 mm. to 0.38 mm. were detected.

EXAMPLE VI

Another metal organic complex fluid was obtained by reacting 272 grams of tetraisopropyl titanate with 78 grams of molybdenyl acetyl acetonate $MoO_2(C_5H_7O_2)_2$. Under vacuum distillation at 2 to 4 mm. pressure, a reaction product was obtained at approximately 100° C. 137 grams of this titanium-molybdenum organic fluid was then further reacted with 411 grams of zinc 2-ethylhexanoate and a new complex fluid was obtained which contained besides titanium and molybdenum, an organic form of the zinc contained in zinc 2-ethylhexanoate. In a distillation under approximately 2 mm. Hg pressure, the new complex fluid was obtained at a distillation range of 298° to 306° C. As a lubricant in the above described Shell Four-Ball Wear Test, a scar of 0.391 mm. was obtained.

EXAMPLE VII 100 grams of the fluid of Example VI was further modified by reacting it with 50 grams of tetra-butyl-tin under a vacuum distillation at approximately 2 mm. Hg pressure. The resulting reaction product was obtained at a distillation range between 275° C. and 295° C. Under the above described Shell Four-Ball Wear Test of this complex fluid containing four different metals, a scar length of 0.35 mm. was obtained.

The above described compositions of Examples I through VII comprise a group of metal organic complexes, all of which have desirable high lubricity and high distillation ranges. These materials, due to their large molecular sizes, have viscosities which for use as low temperature hydraulic fluids and similar purposes may require a reduction of viscosity by the addition of a diluent which does not interfere with the otherwise highly desirable properties of these complexes. Diluents suitable for such a purpose are generally poor lubricants. It has been found, however, that the lubricity of the fluids of Examples I through VII is not greatly adversely affected even after substantial amounts of the diluents are added. This was established by mixing the fluids of Examples I through VII with well known, commercially available silicone organic, petrochemical organic, organophosphate and other diluent fluids.

It was also found that the fluid compositions of Examples I through VII were effective lubricants on non-ferrous metals such as copper, naval brass, aluminum and Monel K, which is a nickel-copper alloy containing approximately 67% nickel, 23% copper and 5% other metals including 1–3% iron, 0.25–2% manganese and 0.5–3% carbon. This was apparent when similar tests were performed in Shell Four-Ball Wear Tester wherein the four balls of the tester were made of the various non-ferrous metals. The scar length on the different metal balls varied with the hardness of the metal itself, but the desirable lubricity of the fluids of the invention and their mixtures with the above described diluents was clearly established.

It is to be understood that although tetraisopropyl titanate and zinc 2-ethylhexanoate are disclosed as having been employed hereinabove in formulating the above described unique metallic titanate compositions, other alkyl titanates such as tetra butyl titanate and other metal octoates such as lead octoate and cobalt octoate could be used in the manner disclosed in applicants' said patent without departing from the spirit or scope of the present invention.

Obviously, many modifications and variations of the present invention are possible in the light of the above teachings. It is therefore to be understood that within the scope of the appended claim, the invention may be practiced otherwise than as specifically described.

What is claimed is:
1. A method for the preparation of a multiple metallic titanate composition which comprises:
  (a) admixing 270 grams of tetraisopropyl titanate with 857 grams of zinc 2-ethylhexanoate;
  (b) subjecting the said titanate and the said zinc 2-ethylhexanoate to a distillation below 280° C. at a pressure of 1 to 10 mm. of mercury whereby low boiling fractions are removed and a first distillation product is obtained;
  (c) admixing 150 grams of the said first distillation product with 50 grams of tri-isopropyl borate;
  (d) and subjecting the said first distillation product and the said tri-isopropyl borate to a distillation below 280° C. at a pressure of 1 mm. of mercury whereby low boiling fractions are removed and a second distillation product is obtained.

References Cited

UNITED STATES PATENTS

| | | | |
|---|---|---|---|
| 3,196,166 | 7/1965 | Kronstein et al. | 260—429.5 |
| 3,322,803 | 5/1967 | Vohwinkel et al. | 260—429.5 |

HELEN M. McCARTHY, Primary Examiner

A. P. DEMERS, Assistant Examiner

U.S. Cl. X.R.

252—49.7; 260—347.8, 429, 429.7, 429.9